Sept. 10, 1968   O. C. MONTGOMERY ET AL   3,400,781
SEISMIC FIRING AND RECORDING SYSTEM Filed Nov. 28, 1966                    5 Sheets-Sheet 1

INVENTORS
O. C. MONTGOMERY
W. N. DOGGETT
BY
Young & Quigg
ATTORNEYS

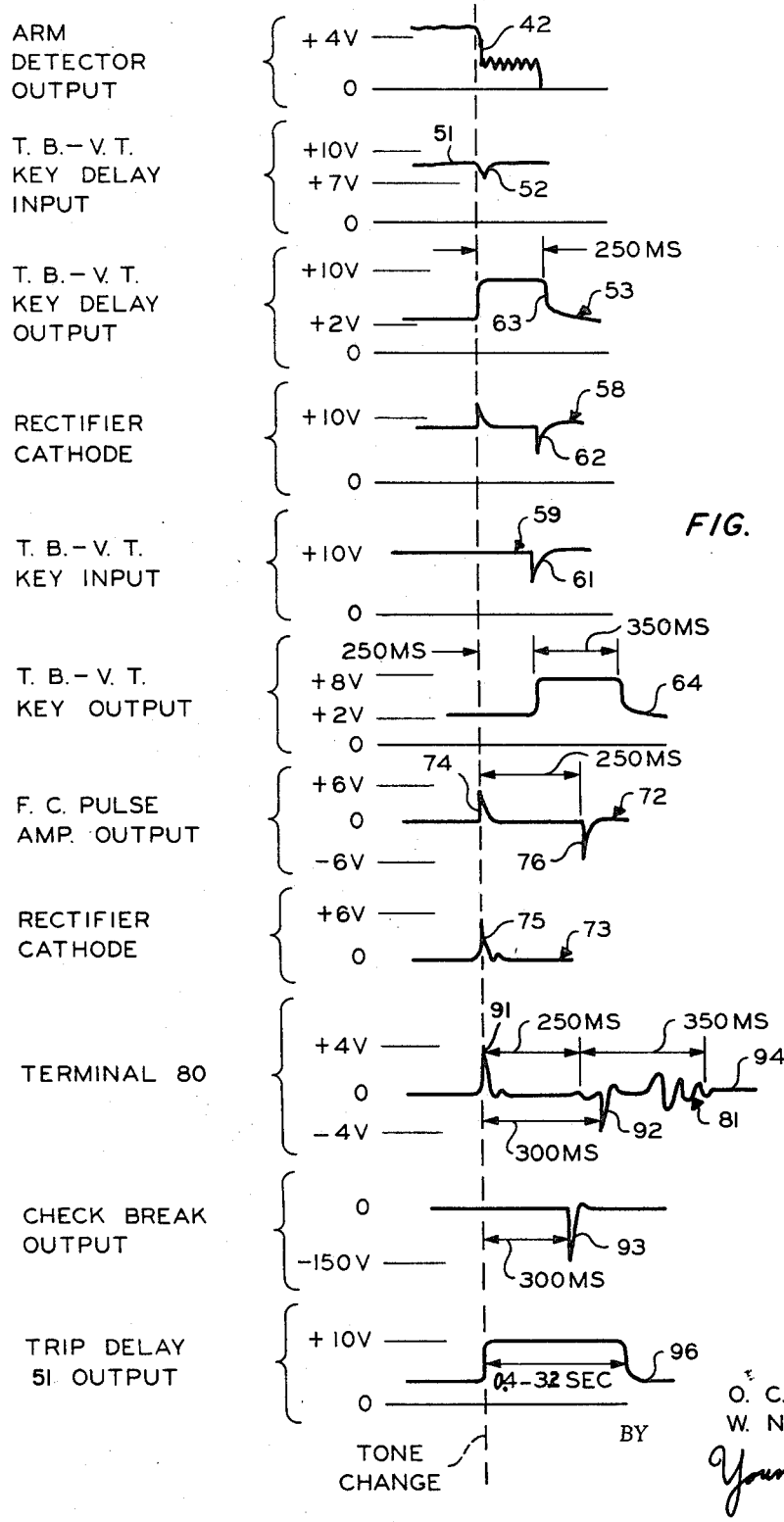

United States Patent Office 3,400,781
Patented Sept. 10, 1968

3,400,781
SEISMIC FIRING AND RECORDING SYSTEM
Orin C. Montgomery and William N. Doggett, Bartlesville, Okla., assignors to Phillips Petroleum Company, a corporation of Delaware
Filed Nov. 28, 1966, Ser. No. 597,442
9 Claims. (Cl. 181—.5)

ABSTRACT OF THE DISCLOSURE

The manual actuation of a tone generator in a central seismic control unit produces a first signal of a first predetermined frequency which energizes a manually actuated arming relay to connect the output of the tone generator to a signal transmitting means. A recorder subsequently actuates the tone generator to produce a second signal of a different predetermined frequency which causes a delayed de-energization of the arming relay. The transmitted signals are received at the shot hole unit and are applied to an F.M. detector and a tuned circuit. An arm relay is connected to the output of the tuned circuit to actuate switching means to pass the output of the detector to a firing circuit. A time break signal and a vertical time signal are transmitted from the shot hole unit to a recorder at the central control unit.

---

This invention relates to a system for actuating a seismic generator by remote control. In one aspect the invention relates to a system for controlling the generation of a seismic signal at a remote location from a central recording unit and for transmitting the time break and vertical time signals from the shot point to the central recording unit. In another aspect the invention relates to a seismic generating and recording system incorporating improved and novel safety features.

Two of the difficulties encountered in actuating seismic generators from a remote location by either cable or radio have been the accidental firing of the charge by extraneous signals such as static, interference and the like, and the premature firing resulting from insufficient coordination between the observer at the recording unit and the shooter at the shot point. Both of these difficulties involve serious danger to personnel near the shot point. A third difficulty has been in the proper sequencing of the means for actuating the seismic charge and the means for transmitting from the shot point to the central recording unit the time break and vertical time signals.

In accordance with this invention, there is provided a novel and improved system to minimize, if not eliminate, the described difficulties. The system includes automatic timing means and switches which must be manually actuated and held by the observer at the central recording unit and the shooter at the shot point before the automatic timing means will initiate the firing sequence. The automatic timing means provides for proper sequencing of the various components, including the transmission of the time break and vertical time signals from the shot point to the central recording unit.

It is an object of the invention to provide an improved system for actuating seismic generators. Another object of the invention is to provide for safety means to prevent premature or accidental firing of the charge. Another object of the invention is to provide means for transmitting the time break and vertical time signals from the shot point to the central recording unit.

Other objects, aspects and advantages of the invention will be apparent from a study of the specification, the drawings and the appended claims to the invention.

Figure 1:
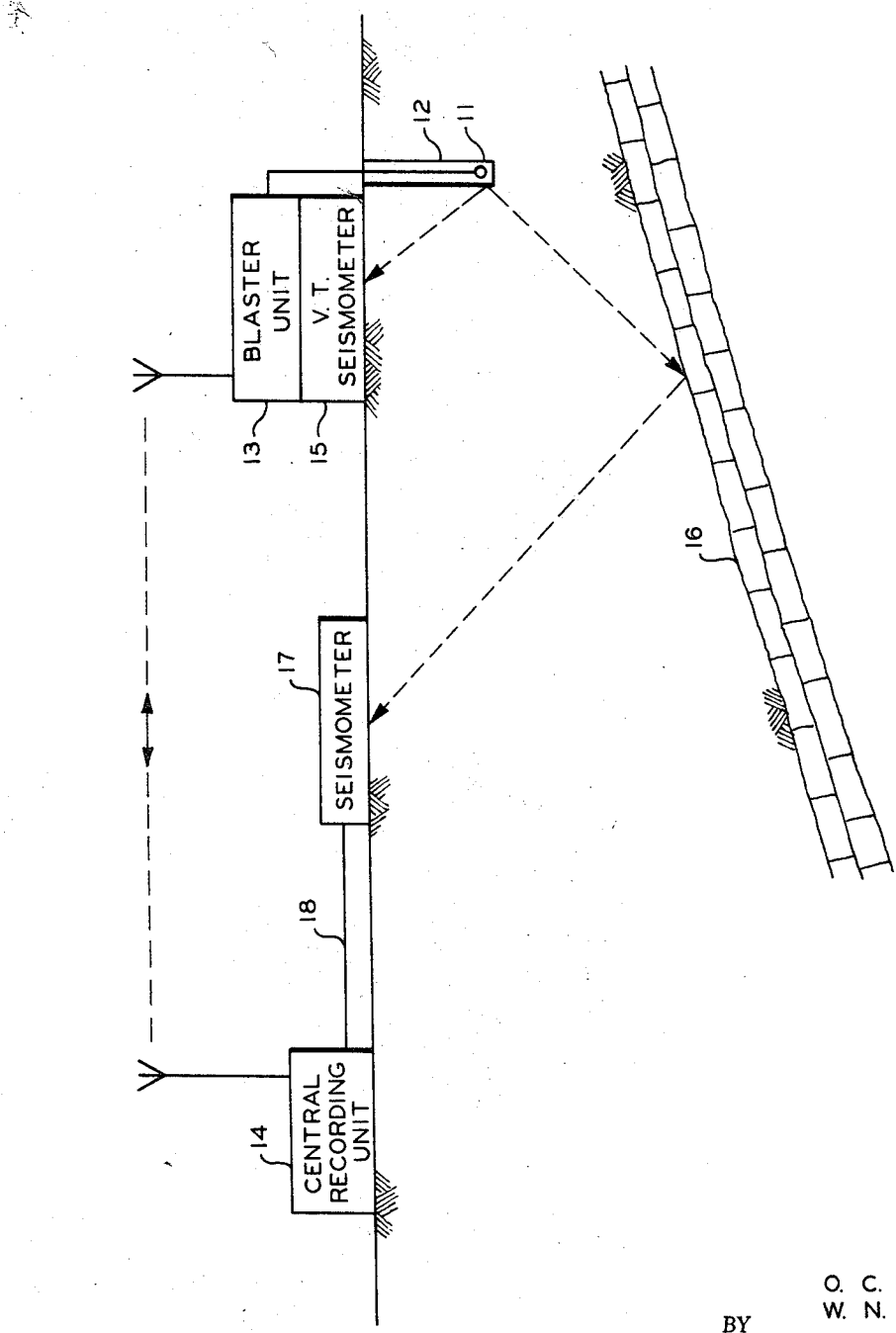
Figure 2:
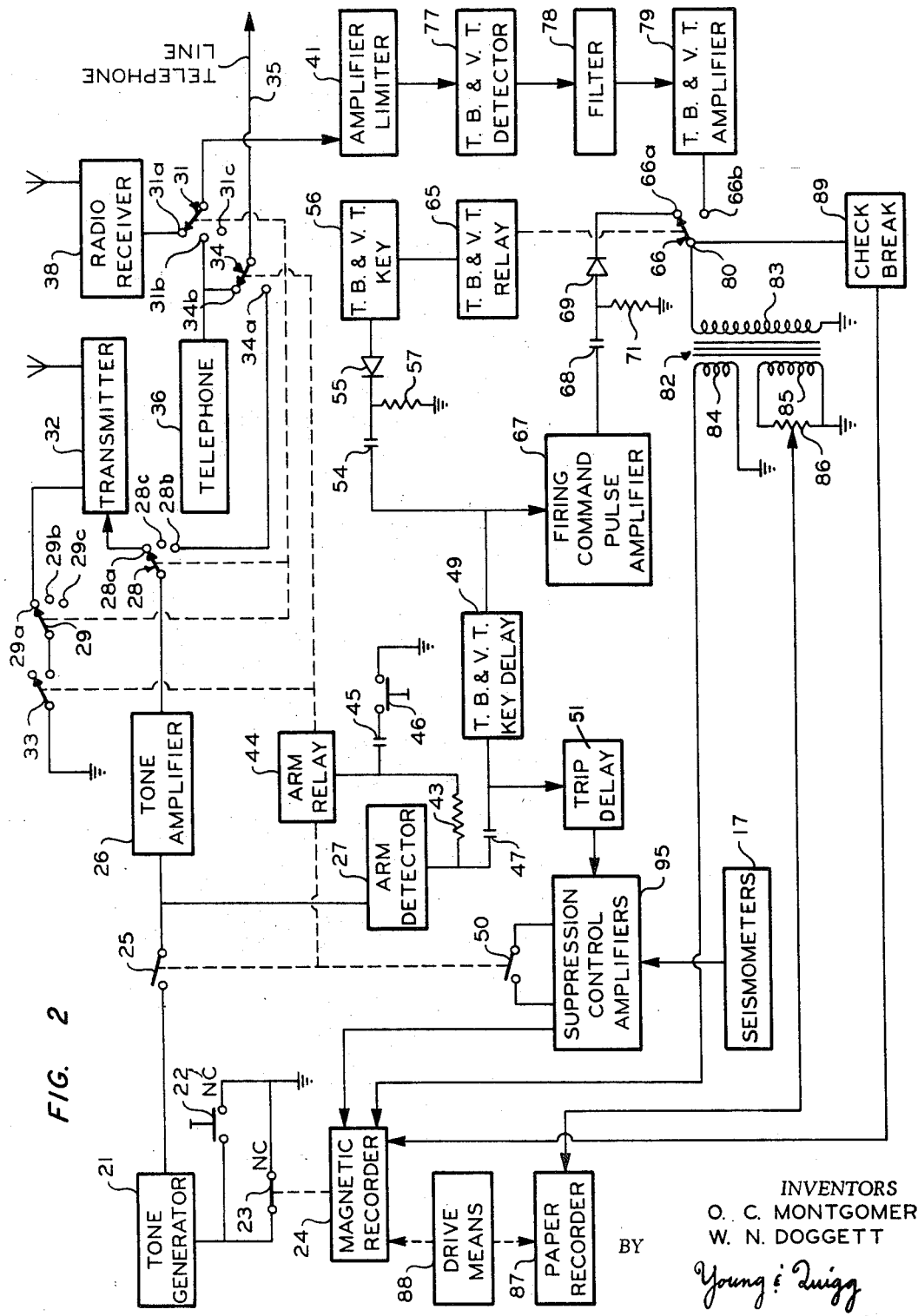
Figure 3:
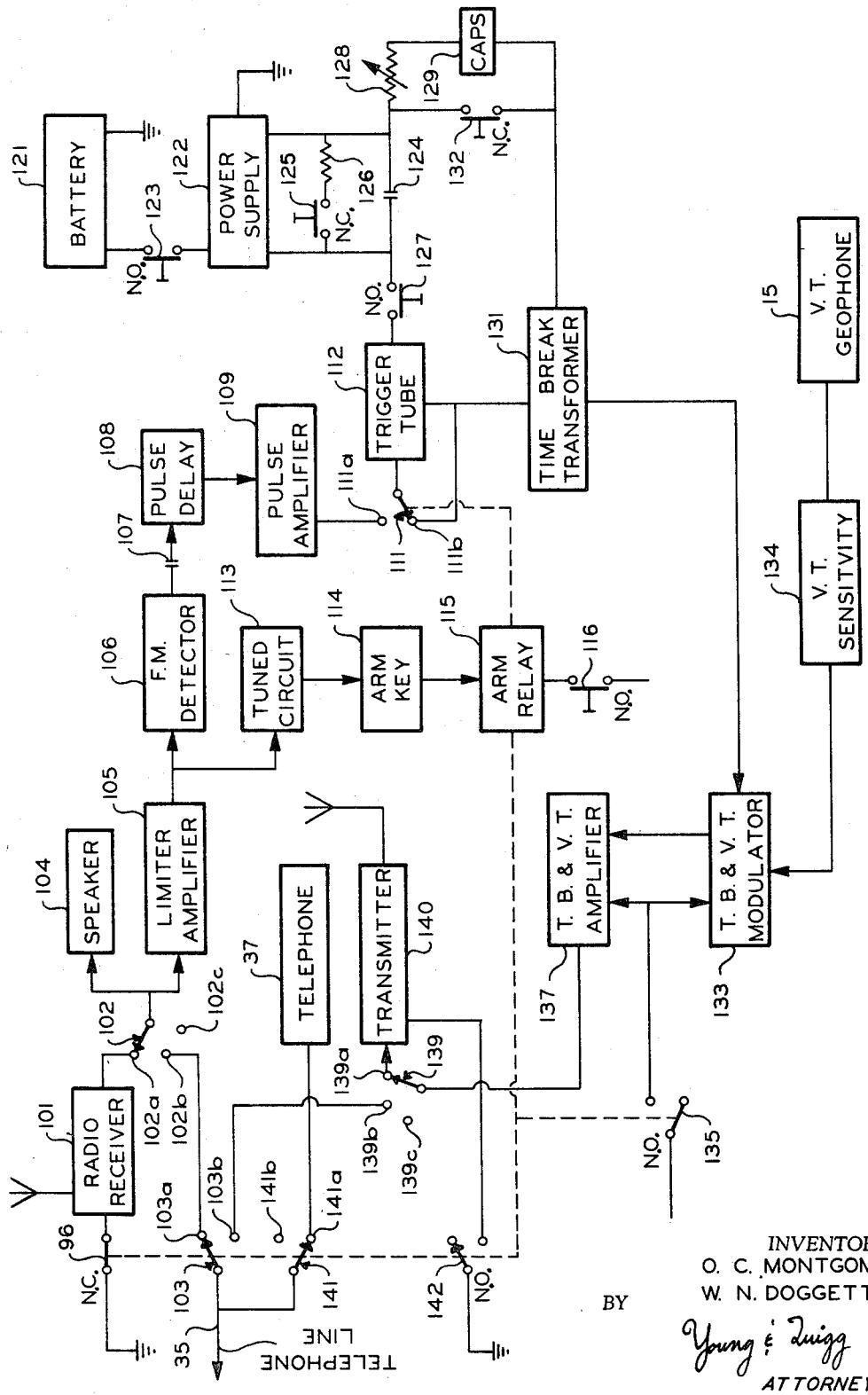
Figure 4:
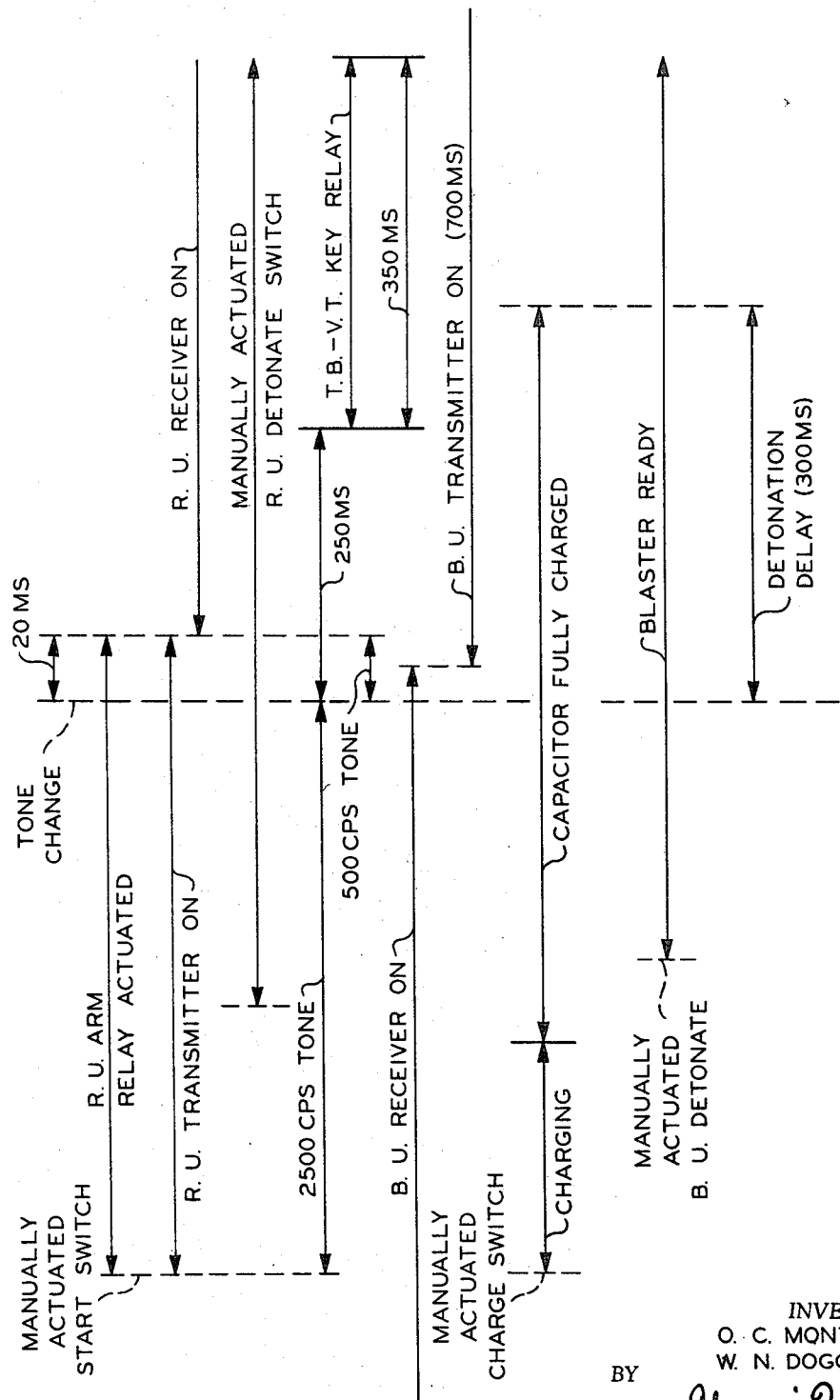

In the drawings FIGURE 1 is a diagrammatic representation of a seismic exploration procedure utilizing the invention; FIGURES 2 and 3 are schematic representations of a central recording unit and a blaster unit in accordance with a presently preferred embodiment of the invention; FIGURE 4 is a timing diagram of the operation of the invention; and FIGURE 5 is a representation of the voltage waveforms at various points in the system.

Referring now to the drawings in general and to FIGURE 1 in particular, an explosive charge 11 is detonated in a shot hole 12 adjacent the surface of the earth by means of blaster unit 13 which is actuated by a radio signal from the central recording unit 14. The time break signal is the pulse generated by the blaster unit 13 to fire charge 11. The resulting vibrations which travel vertically upwardly are detected at a point immediately adjacent the shot hole by vertical time or uphole seismometer 15. The output of this seismometer is called the vertical time signal. While the path of these vibrations is indicated in FIGURE 1 as being at an angle to the vertical for simplicity in illustration, it should be understood that the shot hole 12 is of sufficient depth and the V.T. seismometer 15 is positioned sufficiently close to the shot hole for the true path to be substantially vertical. Thus, the interval between the time break signal and the vertical time signal is the time required for the vibrations to travel from the point of explosion vertically to the surface of the earth. The time break signal and the vertical time signal are transmitted by radio from blaster unit 13 to central recording unit 14.

Other vibrations from the explosion travel downwardly and are reflected from subterranean bed 16 toward seismometer 17. While only one seismometer 17 is illustrated, it is understood that any number of seismometers can be utilized. It is common to employ twenty-four seismometers in a straight line with twelve being on each side of the shot point. The vibrations received by seismometer 17 are transmitted by cable 18 to central recording unit 14.

Referring now to FIGURE 2, tone generator 21 is an oscillator circuit having one terminal connected through normally closed switches 22 and 23 to ground or other suitable source of potential. The opening of switches 22 and 23 alters the resistance values of the R-C circuit of the oscillator. Tone generator 21 produces a 2500 c.p.s. tone when one or both of switches 22 and 23 are closed and produces a 500 c.p.s. tone when both switches 22 and 23 are opened. While switches 22 and 23 have been illustrated as normally closed switches, it is obvious that normally opened switches could be utilized in series to accomplish the same purpose. Switch 22 is a manual "detonation" switch actuated by the observer at the central recording unit 14. Switch 23 is automatically actuated by the drum transport of magnetic recorder 24.

The output of generator 21 is connected through normally open switch 25 to the inputs of tone amplifier 26 and "arm" detector 27. Amplifier 26 amplifies the tone signal for transmission by either telephone line or radio. The output of amplifier 26 is connected to the contactor of switch 28. Switches 28, 29 and 31 are manually operated ganged switches, each having terminals a, b and c, corresponding to three positions of "radio," "cable" and "off." Terminals 28c, 29b, 29c and 31c are blank terminals. Terminal 28a is connected to the audio input of radio transmitter 32. Terminal 29a is connected to the transmitter key input of transmitter 32. The contactor of switch 29 is connected through normally open switch 33 to ground or other suitable source of potential. Thus, transmitter 32 is operated only when the contactor of switch 29 is on terminal 29a and switch 33 is closed.

Terminal 28b is connected to terminal 34a of switch 34. The contactor of switch 34 is connected to one end of a telephone line 35 which runs from the central recording unit 14 to the blaster unit 13. The contactor of switch 34 is normally on terminal 34b to connect suitable communication means 36 through telephone line 35 to communication means 37 (FIGURE 3) at the blaster unit. Terminal 34b is also connected to terminal 31b of switch 31. A radio receiver 38 is connected to terminal 31a. During the transmission of the time break and vertical time signal, the contactor of switch 34 is on terminal 34b. Thus, the time break and vertical time signals, whether received by radio receiver 38 or by way of telephone line 35, are applied through the contactor of switch 31 to the input of amplifier-limiter 41. Transmitter 32 and receiver 38 are built together so that the operation of switch 33 to turn on transmitter 32 turns off receiver 38. Similarly the operation of switch 33 to turn off transmitter 32 turns on receiver 38.

"Arm" detector 27 is a frequency modulation (F.M.) detector which produces an output voltage, the amplitude of which is a function of the frequency of the input signal. As shown by curve 42 in FIGURE 5, the output of "arm" detector is 4 volts for an input frequency of 2500 c.p.s. and drops to less than 2 volts for an input frequency of 500 c.p.s. The output of detector 27 is connected through resistor 43 to an input of transistor driven "arm" relay 44. The input of relay 44 is also connected through capacitor 45 and normally open manually actuated switch 46 to ground or other suitable source of potential. Switch 46 is the manual "arm" or "start" switch which is actuated by the observer to initiate the firing procedure. The actuation of relay 44 closes switch 33 to turn on radio transmitter 32 to broadcast the output of amplifier 26 (if switches 28 and 29 are in the "radio" position on terminals 28a and 29a, respectively), moves the contactor of switch 34 to terminal 34a to disconnect the communication means 36 and to connect telephone line 35 to the output of amplifier 26 (if switch 28 is in the "cable" position on terminal 28b), and closes switch 25 to apply the output of tone generator 21 to the inputs of amplifier 26 and detector 27. The resulting four-volt output of detector 27 is sufficient to hold relay 44 in the actuated position after manually actuated switch 46 is released.

The output of detector 27 is applied through capacitor 47 to produce the differentiated signal represented by waveform 48 (FIGURE 5) which is applied to the inputs of trip delay 51 and time break (T.B.) and vertical time (V.T.) key delay 49. The negative spike 52 in waveform 48, which is caused by a change in the output of generator 21 from 2500 c.p.s. to 500 c.p.s., actuates delay 49 to its unstable state for a period of time determined by the R-C circuitry of delay 49. Delay 49 can be any suitable means such as monostable multivibrator. In a presently preferred embodiment, delay 49 remains in its unstable state for 250 milliseconds (msec.) to produce an output having the waveform 53 (FIGURE 5). This output signal is applied through capacitor 54 to the cathode of rectifier 55. The anode of rectifier 55 is connected to an input of T.B. and V.T. key 56, while the cathode of rectifier 55 is connected through resistor 57 to ground or a suitable source of potential. Capacitor 54 and resistor 57 form a differentiating circuit. The signal appearing at the cathode of rectifier 55 has the waveform 58 (FIGURE 5) while the input to key 56 has the waveform 59 (FIGURE 5). Key 56, which can be any suitable means such as a monostable multivibrator, is altered to its unstable state by the negative pulse 61 of waveform 59, which corresponds to the negative pulse 62 of waveform 58, which in turn corresponds to the trailing edge of the positive pulse 63 of waveform 53. Thus key 56 is actuated at a point in time following the change in the output frequency of generator 21 from 2500 c.p.s. to 500 c.p.s. as determined by the length of time interval of the unstable state of delay 49. In the presently preferred embodiment key 56 is actuated to its unstable state 250 msec. after the downward tone change. A positive tone change, such as from 0 to 2500 c.p.s., does not affect the system as delay 49 reacts only to negative pulses. The output of key 56, which is represented by the waveform 64 (FIGURE 5), is applied to T.B. and V.T. relay 65. Relay 65 is actuated during the positive pulse portion of waveform 64 to move the contactor of switch 66 from terminal 66a to terminal 66b. The output of delay 49 is also applied to the input of firing command pulse amplifier 67. The amplified signal is applied through capacitor 68 to the anode of rectifier 69, the cathode of rectifier 69 being connected to terminal 66a. The anode of rectifier 69 is connected through resistor 71 to ground or other suitable source of potential. Capacitor 68 and resistor 71 form a differentiating circuit. The signals appearing at the anode and cathode of rectifier 69 are represented by waveforms 72 and 73 (FIGURE 5), respectively. Positive pulse 74 of waveform 72 is passed by rectifier 69 to become the firing command pulse 75 of waveform 73. The negative pulse 76 of waveform 72 is blocked by rectifier 69.

The time break and vertical time signals which are received by radio receiver 38 or by way of telephone line 35 are passed through switch 31 to the input of amplifier-limiter 41. The output of amplifier-limiter 41 is applied to an input of T.B. and V.T. detector 77 which is a frequency modulation detector. The output of detector 77 is passed through filter 78 to remove the carrier frequency ripple and is then amplified by T.B. and V.T. amplifier 79. The amplified signal is applied to terminal 66b. Switch 66 is on terminal 66a until the delay time (250 msec.) of delay 49 after the downward tone change and is then on terminal 66b for the delay time (350 msec.) of key 56. The resulting combined signal appearing on the contactor terminal 80 of switch 66 is represented by waveform 81 (FIGURE 5). Terminal 80 is connected to one end of the primary coil 83 of transformer 82 while the other end of the primary coil 83 is connected to ground or other suitable source of potential. Transformer 82 is provided with secondary coils 84 and 85. One terminal of secondary coil 84 is connected to ground while the other terminal thereof is connected to the T.B.-V.T. modulator input of magnetic recorder 24. Potentiometer 86 is connected between the terminals of secondary coil 85, and the contactor of potentiometer 86 is connected to the T.B.-V.T. galvanometer input of paper recorder 87. Magnetic recorder 24 and paper recorder 87 can be driven by common drive means 88. Terminal 80 is also connected to the input of check break 89 which can comprise a silicon controlled switch, or its equivalent, and an amplifier. The positive firing command pulse 91 of waveform 81 (FIGURE 5) turns the silicon controlled switch off while the subsequent T.B. pulse 92 causes the silicon controlled rectifier to turn on and produce a sharp output pulse 93 which is amplified and transmitted to an input of magnetic recorder 24 to be recorded on each seismic signal channel as a check on the time alignment. The vertical time signal 94 of waveform 81 is of insufficient magnitude to cause the silicon controlled switch to produce an output signal.

The outputs of seismometers 17 are applied through respective suppression control amplifiers 95 to respective seismic signal inputs of magnetic recorder 24. Arm relay 44 actuates switch 50 to set amplifier suppression and reduce the gain when relay 44 is returned to its deactuated state by the frequency change from 2500 c.p.s. to 500 c.p.s. Trip delay 51 produces a step pulse 96 (FIGURE 5) responsive to the occurrence of firing command pulse 52. Pulse 96 is applied to the inputs of amplifiers 95 to restore the gain of the amplifiers at the termination of pulse 96. Delay 51 can be any suitable means such as a monostable multivibrator. Two or more delays 51 can be utilized with corresponding groups of seismometers 17 to provide different intervals of suppression for the different groups of seismometers.

Referring now to FIGURE 3, normally closed switch 96 is located in the power circuit of radio receiver 101. The output of radio receiver 101 is connected to terminal 102a of switch 102. Telephone line 35 is connected to the contactor of switch 103. Terminal 103a of switch 103 is connected to terminal 102b of switch 102. The contactor of switch 102 is connected to the inputs of speaker 104 and limiter amplifier 105. The output of limiter amplifier 105 is connected to the input of F.M. detector 106, which produces an output signal having an amplitude which is a function of the frequency of the signal detected by receiver 101. The output of detector 106, which is equivalent to waveform 42, is differentiated by capacitor 107 to produce a detonation pulse equivalent to pulse 52 of waveform 48 (FIGURE 5). The detonation pulse is applied to the input of detonation pulse delay 108, which can be a monostable multivibrator. The step output of delay 108, which lasts for a suitable time such as 300 milliseconds, is applied to the input of transformer coupled amplifier 109. Due to the transformer action on the direct current step pulse signal, the output of amplifier 109 comprises a negative spike pulse and a positive spike pulse corresponding to the leading and trailing edges of the step pulse produced by delay 108. The output of amplifier 109 is connected to terminal 111a of switch 111. The contactor of switch 111 is connected to a grid of cold cathode trigger tube 112. Terminal 111b of switch 111 is connected to the cathode of tube 112.

The output of amplifier 105 is also applied to an input of circuit 113 which is tuned at 500 c.p.s. Circuit 113 produces an output signal only when the output of amplifier has a frequency substantially equal to 500 c.p.s. The output of circuit 113 is applied to the input of arm key 114, which can be a monostable multivibrator producing a step pulse having a duration of approximately 700 milliseconds. The output of key 114 is applied to the input of arm relay 115 to actuate relay 115 during the duration of the 700 milliseconds step pulse to move the contactor of switch 111 to terminal 111a, providing normally open switch 116, connected between relay 115 and a suitable source of potential, has been manually closed by the blaster. The movement of the contactor of switch 111 to terminal 111a permits the application of the positive spike output pulse from amplifier 109 to tube 112, thus causing tube 112 to conduct.

One terminal of battery 121 is connected to ground while the other terminal is connected to a power input terminal of high voltage power supply 122 by way of normally open switch 123. Capacitor 124 is connected across the output terminals of supply 122. Normally closed switch 125 and resistor 126 are connected in series between the output terminals of supply 122. One terminal of capacitor 124 is connected through normally open switch 127 to the anode of tube 112 while the other terminal of capacitor 124 is connected through variable resistor 128 to a first terminal of the series of firing caps 129. The opposite terminal of the firing caps 129 is connected to one terminal of the primary winding of time break transformer 131. The opposite terminal of the primary winding of transformer 131 is connected to the cathode of tube 112. Normally closed switch 132 is connected across resistor 128 and caps 129 to prevent accidental discharge of capacitor 124 through the caps 129.

One terminal of the secondary winding of transformer 131 is grounded while the other terminal thereof is connected to an input of T.B. and V.T. modulator 133. The output of vertical time geophone 15 is connected through V.T. sensitivity control 134 to a second input of T.B. and V.T. modulator 133. Normally open switch 135 is connected between a suitable source of power and the power input terminals of modulator 133 and T.B. and V.T. amplifier 137. Modulator 133 produces a 1500 c.p.s. signal which is frequency modulated by the time break signal from transformer 131 and by vertical time signal from geophone 15. The thus modulated output of modulator 133 is applied to an input of amplifier 137. Control 134 is used to adjust the percent of modulation of the 1500 c.p.s. subcarrier by the V.T. signal. The amplified signal is applied to the contactor of switch 139. Terminal 139a of switch 139 is connected to the input of radio transmitter 140, which is provided with a normally open on-off switch 142. Terminal 139b of switch 139 is connected to terminal 103b, while terminal 139c is a blank terminal. Communication means 37 is connected to terminal 141a of switch 141. The contactor of switch 141 is connected to telephone line 35, while terminal 141b is a blank terminal. Switch 139 is manually operated by the shooter. Switches 135 and 142 are moved to a closed position, switch 96 is moved to an open position, switch 103 is moved to terminal 103a, switch 141 is moved to terminal 141b and switch 111 is moved to terminal 111a, by the actuation of arm relay 115 and are returned to their original position upon deactuation of arm relay 115. While switches 96 and 142 have been illustrated as separate switches, they can be replaced by a single switch to operate both receiver 101 and transmitter 140.

Reference is made to FIGURE 4 for a graphic illustration of the time sequence of events. In the preparation for the shooting operation, the observer at the center recording unit 14 and the shooter at the shotpoint communicate by means of communication means 36 and 37. Assuming it is desired to control the shooting by radio, switches 28, 29 and 31 are manually positioned on the respective "radio" terminal by the observer, while the shooter sets switches 102 and 139 to their "radio" terminals. This turns on the blasting unit radio receiver 101; however, the recording unit radio transmitter is still off as switch 33 is open. When the observer and the shooter agree that the shooting procedure can continue, the shooter manually opens switch 125 and closes switch 123, thus causing capacitor 124 to charge. The charging interval is generally on the order of 10 to 15 seconds. Upon the shooter notifying the observer that capacitor 124 is charged, and both men are prepared to proceed, the observer manually closes start switch 46. This actuates arm relay 44 which closes switch 25, thus applying the 2500 c.p.s. output of generator 21 to arm detector 27 to hold arm relay 44 in the actuated state, closes switch 33 to turn on radio transmitter 32 and moves switch 34 to terminal 34a. The 2500 c.p.s. signal from generator 21 is also passed through amplifier 26 to transmitter 32 which broadcasts the signal to receiver 101. When the shooter hears the 2500 c.p.s. tone from speaker 104, he manually closes normally open switch 127 and opens normally closed switch 132. The shooter must manually maintain switches 125, 127 and 132 in their actuated position. If for any reason the shooter releases any one of switches 125, 127 and 132 before the detonation of caps 129, the detonation would be prevented. Closure of switch 125 would discharge capacitor 124 through resistor 126; closure of switch 132 would establish a direct shunt or short circuit across the caps; and opening switch 127 would prevent the firing of tube 112 from establishing a discharge circuit for capacitor 124.

The observer permits sufficient time to elapse for the shooter to actuate switches 127 and 132, and then manually actuates the switch 22. When magnetic recorder 24 next reaches the proper recording position, recorder 24 actuates switch 23 to an open position, causing a tone change from 2500 c.p.s. downward to 500 c.p.s. The effect of this tone change is to deactuate arm relay 44, thus turning off radio transmitter 32 and disconnecting tone generator 21, and to actuate arm relay 115, thus turning off radio receiver 101, turning on radio transmitter 140, amplifier 137 and modulator 133, and connecting the tube 112 to receive the delayed detonation pulse. The firing of tube 112 at the end of the 300 msec. delay permits capacitor 124 to discharge through caps 129 and transformer 131. The resulting pulse signal is applied by transformer 131 to modulator 133 for broadcast by transmitter 140 to the receiver 38 as the time break signal. The signals representative of the vibrations occurring at the surface of the shothole as a result of the detonation are transmitted by geophone 15 to modulator 133. The time break signal and vertical time signal are processed and then recorded on recorders 24 and 87. Display of undesirable transients is avoided by connecting the output of amplifier 79 to the recorders only when the time break and vertical time signals are to be recorded. The outputs of seismometers 17 are simultaneously recorded on recorder 24.

When two or more recording trucks are operated in parallel, the arm detector 27 of all but one unit can be disconnected from its respective tone generator 21 and connected to the tone generator of the master recording truck. Each slave unit will record the time break and vertical time signals and trip amplifier suppression for its respective geophones 17. The tone generator 21 of each slave is turned off during slave operation.

Reasonable variations and modifications are possible within the scope of the foregoing disclosure, the drawings and the appended claims to the invention.

We claim:
1. Apparatus comprising:
 (a) recording means;
 (b) a tone generator containing first and second switches and which produces a tone having a first frequency when at least one of said first and second switches is in a first position and produces a tone having a second frequency different from said first frequency when both of said first and second switches are in a second position, said first switch being a manually actuated arming switch and second switch being actuated by said recording means according to the position of said recording means;
 (c) a first arm detector which produces an output signal, the amplitude of which is a function of the frequency of the input signal;
 (d) signal transmitting means;
 (e) third switching means connecting the output of said tone generator to an input of said signal transmitting means and to an input of said first arm detector;
 (f) first arm relay means having an actuated state and a deactuated state, means connecting the output of said first arm detector to said first arm relay means whereby said first arm relay means is changed from the deactuated state to the actuated state responsive to an output signal from said first arm detector representative of the application to the input of said first arm detector of a signal having said first frequency, said arm relay means being deactuated by a change in frequency from said first frequency to said second frequency, means for manually actuating said first arm relay means;
 (g) means, responsive to the actuation of said first arm relay means, to cause said signal transmitting means to transmit the output of said tone generator;
 (h) signal receiving means for receiving the signals transmitted by said signal transmitting means;
 (i) a frequency modulation detector which produces an output signal, the amplitude of which is a function of the frequency of the input signal thereto;
 (j) a tuned circuit having a resonant frequency substantially equal to said second frequency;
 (k) means connecting the output of said signal receiving means to an input of said frequency modulation detector and to an input of said tuned circuit;
 (l) a firing circuit having an explosive charge connected therein, and which is actuated by the application of a pulse to the input thereof;
 (m) pulse delay means connected to the output of said frequency modulation detector;
 (n) fourth switching means connecting the output of said pulse delay means to said input of said firing circuit;
 (o) a keying circuit connected to the output of said tuned circuit to produce a keying pulse when a signal of substantially said resonant frequency is applied to the input of said tuned circuit;
 (p) a second arm relay having an actuated state and a deactuated state, connected to the output of said keying circuit, manually operable means to energize said second arm relay, said second arm relay being changed to the actuated state by the application thereto of said keying pulse when said manually operable means is actuated; and
 (q) means responsive to the actuation of said arm relay to cause said fourth switching means to pass the output of said pulse delay means to the input of said firing circuit.

2. Apparatus in accordance with claim 1 further comprising means for differentiating the output of said first arm detector to produce a first pulse responsive to the change in frequency of the output of said tone generator; means responsive to the occurrence of said first pulse to produce a time delay pulse, means for differentiating said time delay pulse to produce second and third pulses of opposite polarity responsive to the beginning and termination of said time delay pulse, respectively, and means for rectifying said second and third pulses to pass only said second pulse as a firing command pulse.

3. Apparatus in accordance with claim 1 wherein said firing circuit comprises a cold cathode trigger tube having an anode, a grid and a cathode; said grid being connected to one terminal of said fourth switching means as the input of the firing circuit; a normally open, manually actuatable switch, a capacitor, a variable resistance, and at least one explosive charge connected in series between said anode and said cathode of said cold cathode trigger tube; means for charging said capacitor; and a normally closed, manually actuatable switch connected in parallel with said at least one explosive charge.

4. Apparatus in accordance with claim 3 further comprising a time break transformer having a primary coil connected in the circuit between the anode and cathode of said cold cathode trigger tube; a modulator; means connecting the secondary coil of said transformer to a first input of said modulator; a vertical time geophone positioned adjacent the location of said explosive charge; means connecting the output of said geophone to a second input of said modulator; means for transmitting the output of said modulator; and means for receiving the transmitted output of said modulator and producing responsive thereto a time break signal representing the firing of said cold cathode trigger tube and a vertical time signal representing the output of said geophone.

5. Apparatus in accordance with claim 4 further comprising means for differentiating the output of said first arm detector to produce a first pulse responsive to the change in frequency of the output of said tone generator; means responsive to the occurrence of said first pulse to produce a time delay pulse; means for differentiating said time delay pulse to produce second and third pulses of opposite polarity responsive to the beginning and termination of said time delay pulse, respectively; means for rectifying said second and third pulses to pass only said second pulse as a firing command pulse; means responsive to the termination of said time delay pulse to produce a second keying pulse; time break and vertical time relay means; means connecting said second keying pulse to said time break and vertical time relay means to energize said time break and vertical time relay means during the duration of said second keying pulse; fifth switching means; means for applying said firing command pulse to one input terminal of said fifth switching means; means for applying said time break signal and said vertical time signal to a second input terminal of said fifth switching means; means connecting the output of said fifth switching means to said recording means; said fifth switching means being actuated by said time break and vertical time relay means to connect said second input terminal of said fifth switching means to the output of said fifth switching means during the duration of said second keying pulse and to connect said first input terminal of said fifth switching means to said output of said fifth switching means in the absence of said second keying pulse.

6. Apparatus in accordance with claim 5 wherein said first and second frequency outputs of said tone generator are 2500 c.p.s. and 500 c.p.s., respectively.

7. Apparatus in accordance with claim 6 wherein said signal transmitting means is a radio transmitter and said signal receiving means is a radio receiver.

8. Apparatus in accordance with claim 7 wherein said first arm relay means, upon actuation thereof, turns on said radio transmitter and upon deactuation thereof turns off said radio transmitter and turns on said radio receiver.

9. Apparatus comprising:
  (a) a tone generator for sequentially producing an output signal having a first frequency and an output signal having a second frequency different from said first frequency;
  (b) a first arming means;
  (c) signal transmitting means;
  (d) means for connecting the output of said tone generator to an input of said signal transmitting means and to an input of said first arming means;
  (e) said first arming means having an actuated state and a deactuated state, whereby said first arming means is changed from the deactuated state to the actuated state responsive to an output signal having said first frequency from said tone generator, said first arming means being deactuated by a change in frequency in the output signal of said tone generator from said first frequency to said second frequency;
  (f) means, responsive to the actuation of said first arming means, to cause said signal transmitting means to transmit the output of said tone generator;
  (g) signal receiving means for receiving the signals transmitted by said signal transmitting means;
  (h) a firing circuit having an explosive charge connected therein, and which is actuated by the application of a detonation pulse to the input thereof;
  (i) detonation pulse producing means connected to an output of said signal receiving means for producing a delayed detonation pulse upon a change in the frequency of the signal at said output of said signal receiving means;
  (j) switching means adapted to connect the output of said detonation pulse producing means to said input of said firing circuit;
  (k) second arming means connected to said output of said signal receiving means, to produce an arming pulse only when a signal having said second frequency is applied to the input of said second arming means from said output of said signal receiving means; and
  (l) means responsive to said arming pulse to actuate said switching means to connect said output of said detonation pulse producing means to said input of said firing circuit.

References Cited

UNITED STATES PATENTS

| | | | |
|---|---|---|---|
| 3,225,852 | 12/1965 | Pfab | 181—.5 |
| 3,231,041 | 1/1966 | Kokesh | 181—.5 |
| 3,316,996 | 5/1967 | Ball et al. | 181—.5 |
| 3,342,283 | 9/1967 | Pound | 181—.5 |

BENJAMIN A. BORCHELT, *Primary Examiner.*

T. H. WEBB, *Assistant Examiner.*